United States Patent
Kosmowski

(10) Patent No.: US 8,207,472 B2
(45) Date of Patent: Jun. 26, 2012

(54) DEBRIS CAPTURE AND REMOVAL FOR LASER MICROMACHINING

(75) Inventor: Mark T. Kosmowski, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 825 days.

(21) Appl. No.: 12/326,694

(22) Filed: Dec. 2, 2008

(65) Prior Publication Data

US 2009/0314753 A1 Dec. 24, 2009

Related U.S. Application Data

(60) Provisional application No. 61/073,672, filed on Jun. 18, 2008.

(51) Int. Cl.
B23K 26/38 (2006.01)
B23K 26/14 (2006.01)

(52) U.S. Cl. .......... 219/121.67; 219/121.72; 219/121.84

(58) Field of Classification Search .......... 219/121.63–121.72, 121.84
See application file for complete search history.

(56) References Cited

U.S. PATENT DOCUMENTS 5,659,921 A * 8/1997 Narayan .................. 15/349
7,038,166 B2 * 5/2006 Denney et al. ........... 219/121.86

FOREIGN PATENT DOCUMENTS

| JP | 10137970 A | * | 5/1998 |
| JP | 2002-160087 A | | 6/2002 |
| JP | 2002-210582 A | | 7/2002 |
| JP | 2007-175721 A | | 7/2007 |
| JP | 2008-501531 A | | 1/2008 |

OTHER PUBLICATIONS

Mai, Tuan A., "Toward Debris-Free Laser Micromachining," Industrial Laser Solutions, 23:1, 2008.

* cited by examiner

*Primary Examiner* — Samuel M Heinrich
(74) *Attorney, Agent, or Firm* — Stoel Rives LLP

(57) ABSTRACT

A method of capturing and removing metallic debris created on a target side of a target metal specimen undergoing laser micromachining entails providing a barrier that encompasses the immediate volume surrounding a laser cutting head output nozzle to contain the ejected debris and extracting the debris through a vacuum outlet. A preferred system implementing this approach to debris management includes a barrier in the form of a flexible fiber brush configured in the shape of a ring and positioned to trap ejected debris within a localized area surrounding a target area where the laser beam is incident on the target metal specimen. The ring brush is made of material that is robust to molten metals. An inert gas directed at a high flow rate along the target surface of the metal specimen carries ejected surface debris trapped in the ring brush toward a vacuum outlet.

14 Claims, 3 Drawing Sheets

DEBRIS CAPTURE AND REMOVAL FOR LASER MICROMACHINING

RELATED APPLICATION

This application claims benefit of U.S. Provisional Patent Application No. 61/073,672, filed Jun. 18, 2008.

COPYRIGHT NOTICE

© 2008 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

The system disclosed addresses management of debris generated by laser processing and, more specifically, by laser micromachining of small-scale target specimen features.

BACKGROUND INFORMATION

Machining metals and other target specimens using a laser beam generates a significant amount of molten debris. Most of the debris is ejected from the immediate region surrounding the laser cut, as the laser beam blasts through the target specimen material. Debris from the area within the width of the laser cut, or "kerf," may be ejected by a high-pressure jet of cutting head gas flowing along the laser beam propagation axis and out of a nozzle through which the laser beam is focused. Thus, the laser beam propagates and the cutting head gas flows along a common axis. Remaining debris particles are ejected at high velocity (several km/sec) along trajectories perpendicular to the kerf, both axially of (i.e., normal to) the target surface and parallel to the target surface of the target specimen undergoing machining. The sizes of these particles range from sub-millimeter to sub-micron, and the particle temperatures are high, typically at least several hundred degrees centigrade. Without proper debris containment during the laser micromachining process, the laser system becomes polluted with axial debris and requires daily cleaning and maintenance. In addition, surface debris may block the laser beam cutting path, reducing ablation efficiency.

The current state of the art of debris management in semiconductor micromachining systems is highly dependent on the application. In some applications, such as for example, semiconductor wafer scribing, processing may be restricted to the wafer backside, thereby completely avoiding the target surface and steering clear of active layers of circuitry. Other applications address debris ejected through the underside of a target material undergoing laser micromachining, while the remainder of the debris on the target surface of the material is not managed or contained. Most laser micromachining systems are designed with proper covers and shields to protect sensitive subsystem components from vapor and molten deposits, but these shields intercept and trap only a small portion of the ejected material. Although they protect the micromachining equipment, the shields do not address quality assurance of the electronic parts being processed.

When drilling prescribed holes, a "sandwich" technique may be used that entails covering both surfaces of the target with a protective layer, drilling through both the protective coverings and the target material, and later peeling off the coverings and surface debris together (Tuan A. Mai, "Toward Debris-free Laser Micromachining," *Industrial Laser Solutions*, 23:1, 2008). Another similar technique entails coating a surface with a benign protective layer (e.g., photoresist) that traps debris and can be dissolved after laser processing. Yet another technique entails cutting in the presence of a water spray or a water film bathing the target surface; however, the presence of liquid tends to result in mist or condensation affecting the laser optics (Sun and Longtin, "Ultrafast Laser Micromachining with a Liquid Film," *Proc. ICALEO*, 2001).

Brushes have been used as debris management devices in related industries, such as printed circuit board (PCB) milling that uses end mills to drill macroscopic holes in a plastic PCB backplane to enable routing of the printed circuits. Some designs incorporate vacuum exhaust, but the systems currently implementing these designs do not fully encompass the cutting area. A considerable amount of material may, therefore, escape from the debris containment system. In the PCB milling application, an external vacuum hose may be attached to the back of the circuit board to enable intermittent application of vacuum pressure to remove the board material as it is drilled out. Alternatively, a brush may surround the drill bit, or "end mill," and associated end mill spindle, and a brush housing that supports the brush may be equipped with a vacuum port to exhaust debris generated by drilling the board material. An example of such PCB milling equipment is a Final Touch 101 depaneling router system, available from Precision PCB Products of Irvine, Calif.

SUMMARY OF THE DISCLOSURE

A method of capturing and removing debris created on a target side of a target specimen undergoing laser micromachining entails providing a barrier that encompasses the immediate volume surrounding a laser cutting head output nozzle to contain the ejected debris and extracting the debris through a vacuum outlet. A preferred system implementing this approach to debris management includes a barrier in the form of a flexible fiber brush configured in the shape of a ring and positioned to trap ejected debris within a localized area surrounding a target area where the laser beam is incident on the target specimen. The target specimen is preferably made of metal, and the ring brush is made of material that is robust to molten metals. The perimeter of the ring brush is positioned to encompass the axis of propagation of the laser beam, and the distance from the propagation axis to the ring brush perimeter is made sufficiently large to allow the molten debris to cool before it encounters the brush. An inert gas directed at a high flow rate along the target surface of the metal specimen carries ejected surface debris trapped in the ring brush toward a vacuum outlet.

The disclosed system contains ejected surface debris and thereby enables automatic capture and disposal of the surface debris and the axial debris produced by the laser micromachining of the target specimen. The flexible fiber brush material sustains temperatures of up to at least several hundred degrees and does not impart damage on contact with the target surface. Standard laser-based via drilling equipment may be retrofitted with, or re-designed to accommodate, the components necessary to provide the surface gas flow, debris containment, and vacuum exhaust.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
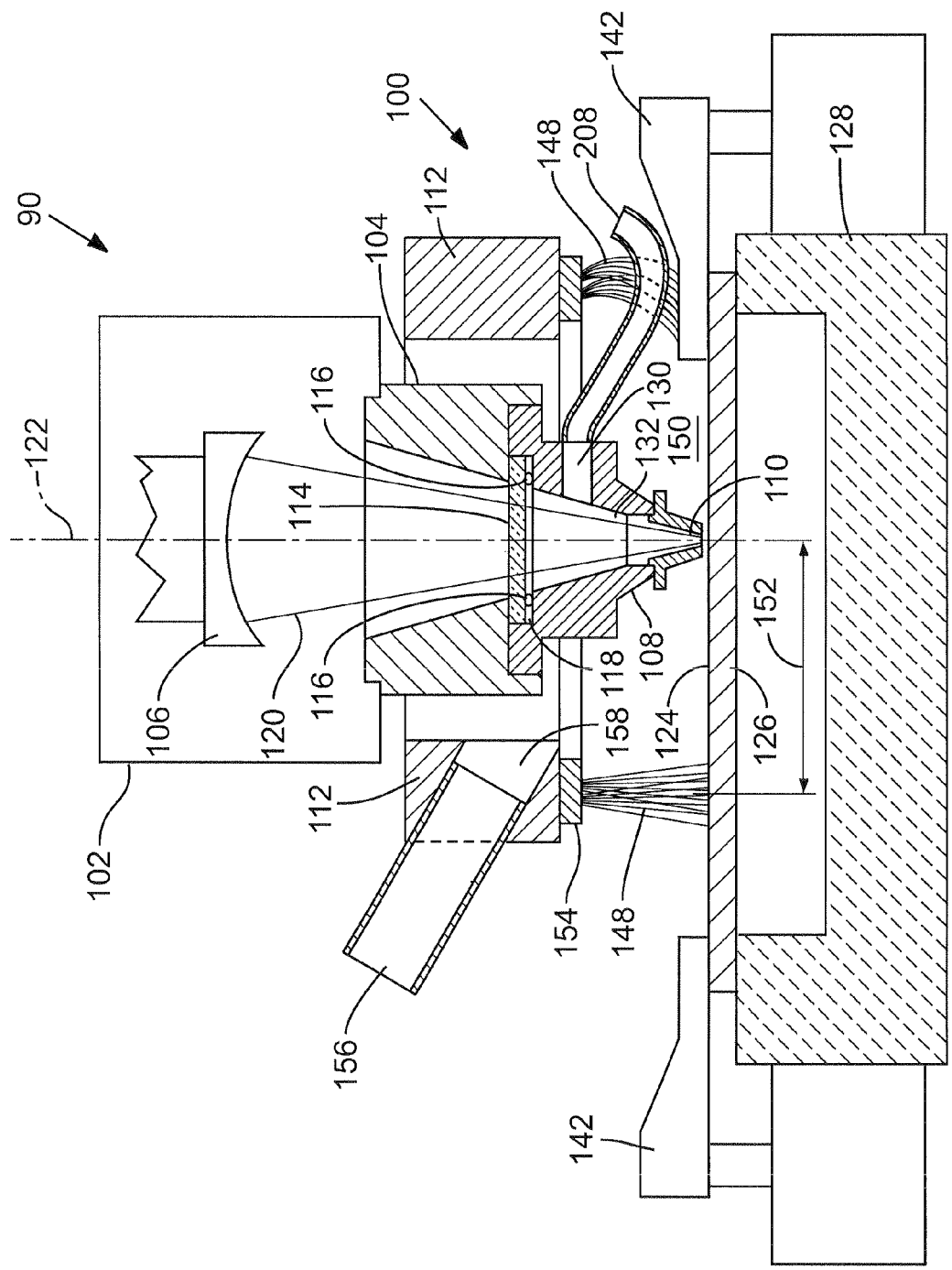
FIG. 1 is a cross-sectional view of a laser cutting head and debris management components that include a ring-shaped flexible fiber brush skirt positioned to capture debris generated by laser micromachining a target specimen.
Figure 2:
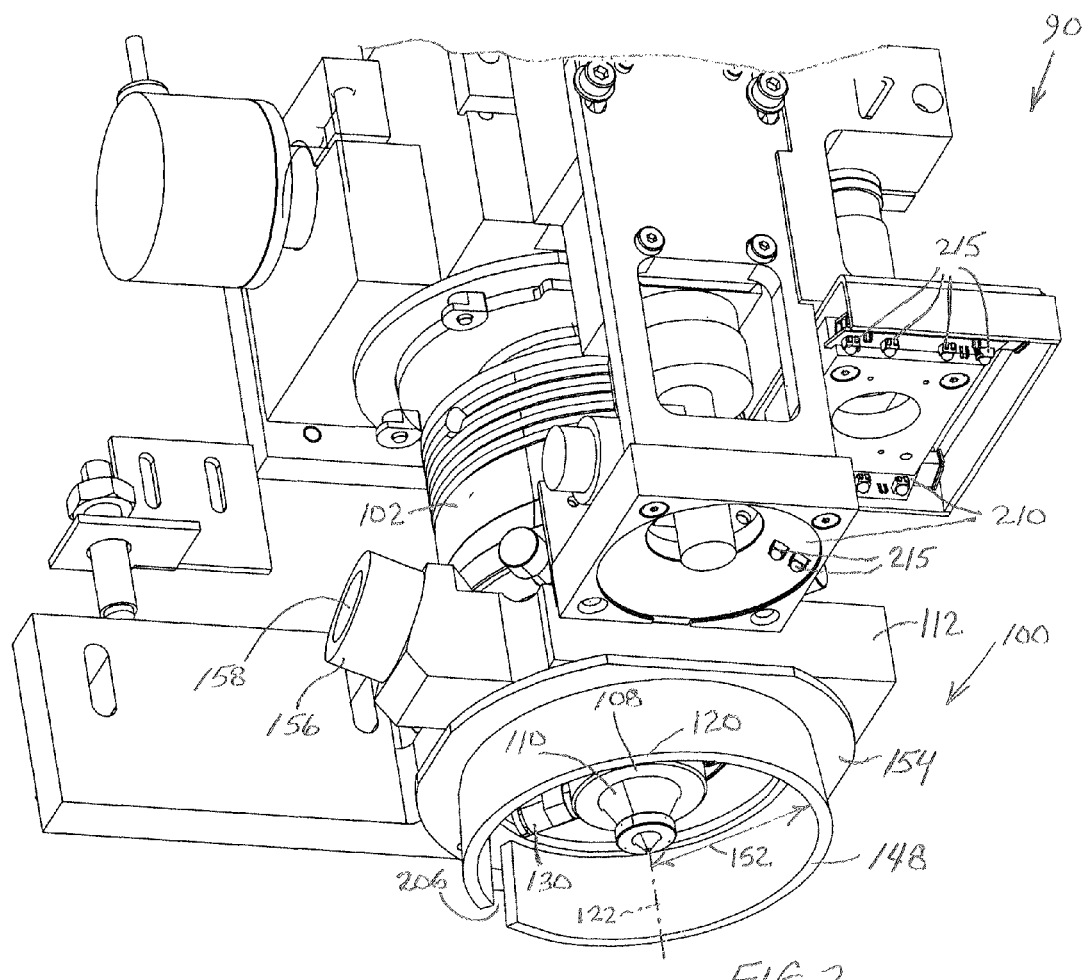
FIG. 2 is a fragmentary isometric view of the laser cutting head and debris management components including the flexible fiber ring brush of FIG. 1.
Figure 3:
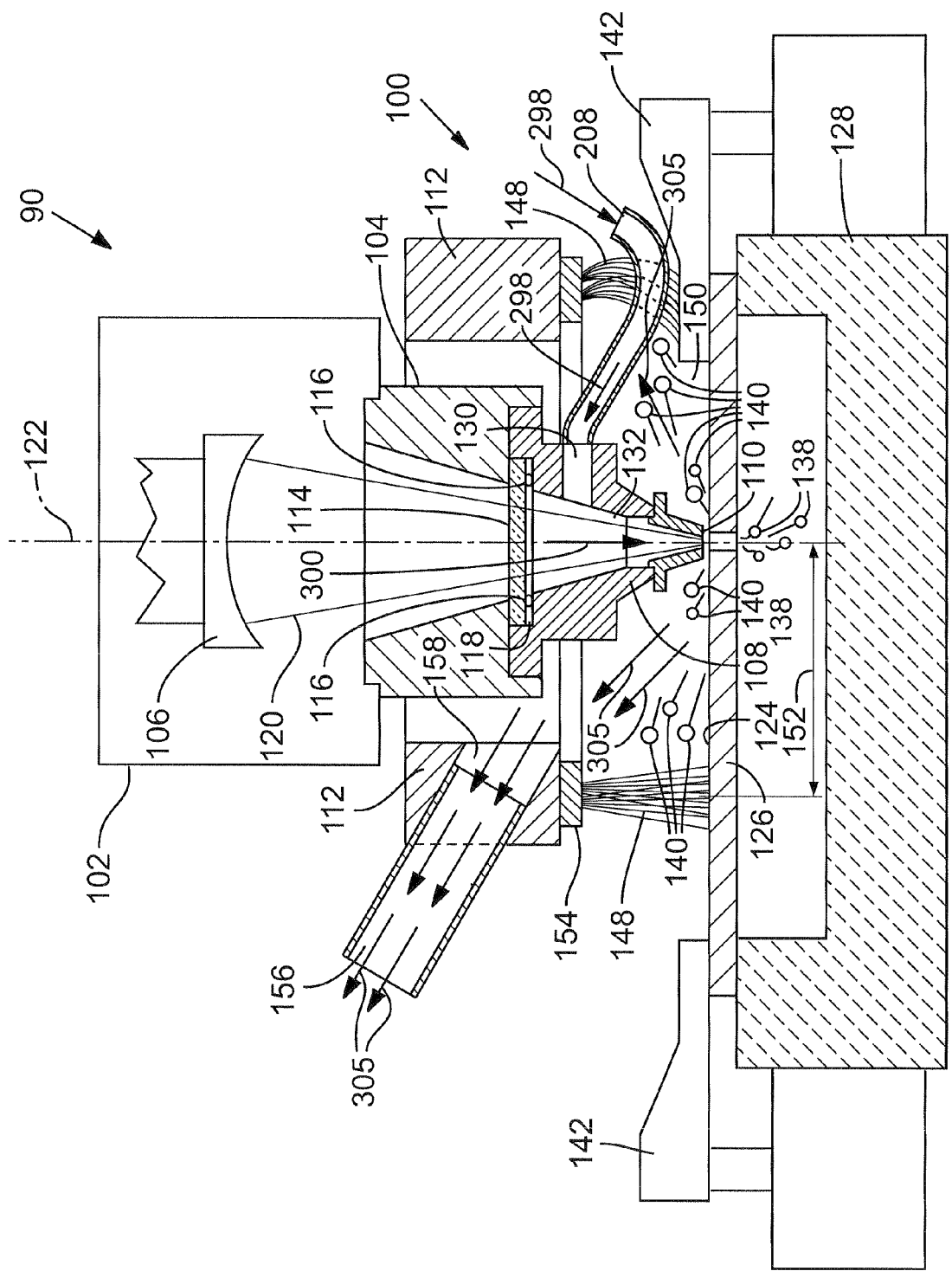
FIG. 3 is a replica of FIG. 1 but is annotated to indicate flow paths of cutting gas and ejection paths of debris generated by laser micromachining of the target specimen.

FIGS. 1-3 show a laser cutting head 90 of a laser micromachining system. Laser cutting head 90 includes laser micromachining-generated debris management (i.e., containment and removal) components 100 associated with a laser focusing lens assembly 102 and a laser cutting head alignment assembly 104 that are adjoined as a unitary structure. Lens assembly 102 includes light beam focusing optical components 106 (shown in FIGS. 1 and 3 collectively as a single lens component), and cutting head alignment assembly 104 includes at its bottom end a nozzle and purge gas mount 108 to which a laser beam and gas flow output nozzle 110 is affixed. A debris removal collar 112 supports cutting head alignment assembly 104 and nozzle and purge gas mount 108. Optical components 106 of lens assembly 102 are positioned safely behind a protective debris window 114 set and sealed by an O-ring 116 in a recess 118 in the top end of nozzle and purge gas mount 108, where it is adjoined with cutting head alignment assembly 104.

A laser beam 120 emitted by a laser source (not shown) propagates along a beam propagation and cutting head gas flow common axis 122 through lens assembly 102 and output nozzle 110 of cutting head alignment assembly 104. Laser beam 120 is focused by lens assembly 102 and directed by cutting head alignment assembly 104 for incidence on a target surface 124 of a target specimen 126 that is secured to a chuck 128. Cutting head alignment assembly 104 is configured for lateral positioning of common axis 122 by a three-point adjustment relative to debris removal collar 112. A purge gas inlet 130 admits into a conically shaped gas pressure chamber 132 of nozzle and purge gas mount 108 high pressure inert cutting head gas as laser beam 120 propagates through gas pressure chamber 132. Laser beam 120 propagates and high pressure cutting head gas flows through output nozzle 110 to, respectively, cut material from target specimen 126 and eject debris material from a kerf formed in the region of material cut from target specimen 126.

The following description is presented with reference to use of an infrared (IR) laser beam 120 in the formation of through-holes in target specimen 126 of metal material. Other suitable target materials include polyvinyl alcohol-coated metal; glass; ceramics; and any number of composite materials, including KEVLAR and carbon fiber.

Debris ejected from the kerf may be categorized as axial debris 138 and surface debris 140 having trajectories that are substantially perpendicular and substantially parallel, respectively, to target surface 124 of metal specimen 126. Two challenges associated with capturing such ejected debris include a wide range of different topographies (i.e, hills, valleys, and canyons) of target surface 124 that can trap surface debris 140 and the high temperature of molten metal debris ejected. A change in topography over target surface 124 can be, for example, a five mm stair step presented by a clamp 142 holding target specimen 126 in place against chuck 128.

A preferred embodiment of debris management components 100 includes a flexible fiber brush skirt 148 in the shape of a ring functioning as a barrier that captures micromachining debris by encompassing as much space as possible within an internal volume 150 surrounding output nozzle 110. In this preferred embodiment, ring brush 148 is configured as an annulus centered around common axis 122 and having a mean radius 152 at target surface 124. In general, however, ring brush 148 may be configured in the shape of an oval or a straight-sided polygon. Ring brush 148 downwardly depends from and, for ease of replacement, is releasably mounted to a barrier or brush mounting plate 154.

Ring brush 148 appears in cross section in FIGS. 1 and 3 as two trapezoids equidistantly positioned from common axis 122 at output nozzle 110 and having bristles in which clamp 142 is partly enmeshed. Ring brush 148, which traps ejected surface debris 140 at near molten temperatures, is made of flexible fiber material to ensure it does not scratch or damage components undergoing micromachining. Ring brush 148 is therefore preferably fashioned from a fiber having a very high melting temperature, such as polytetrafluoroethylene (PTFE) "Teflon®" material, which melts at 680 F, or carbon fiber, which melts at 1500 F. The flexing of ring brush 148 as it contacts different target surface topographies causes debris caught in the brush bristles to flake off of them, thereby exhibiting a self-cleaning property. Ring brush 148 has mean radius 152 of a value setting an effective perimeter distance and an internal volume boundary that allow ejected surface debris 140 to cool to a temperature below the melting temperature of ring brush 148 before its bristles trap ejected surface debris 140.

Although it has a higher melting temperature than that of PTFE material, carbon fiber is less preferred because it is less resilient and is, therefore, slow to return to its nominal shape when encountering changes in target surface topography. A drape made of suitable material would provide adequate performance if target surface 124 is flat.

An alternative ring brush 148 exhibiting longer lifetime is constructed with hybrid bristles in the form of concentric ring members that include an outer ring of PTFE bristles and an inner ring of carbon fiber. The outer ring of PTFE bristles has better resilience and memory, but it melts when laser cutting head 90 is in continuous production use. The inner ring of carbon fiber does not melt; therefore, the outer PTFE bristles function as a support mechanism for the inner carbon fiber bristles, which protect the PTFE bristles from the molten debris.

A vacuum outlet port 156 of a fluid passageway 158 formed in debris removal collar 112 is in fluid communication with internal volume 150 to enable continuous evacuation by a remote vacuum pump (not shown) of surface debris 140 generated by the cutting operation of laser beam 110 and contained within internal volume 150 by ring brush 148.

FIG. 2 is a three-dimensional rendering of laser cutting head 90, as it appears when viewed upwardly from metal specimen 126. In the preferred embodiment shown, debris management components 100 include brush mounting plate 154 to which ring brush 148 is mounted and vacuum outlet port 156 fitted into fluid passageway 158 formed in debris removal collar 112. Debris management components 100 are retrofitted to a standard laser-based printed circuit board via drilling system, such as a Model 5500 system manufactured by Electro Scientific Industries, Inc., the assignee of this patent application. The Model 5500 system is retrofitted with laser heads emitting IR laser beams to cut metal specimen 126. Ring brush 148 is shown mounted to brush mounting plate 154 fixed on the bottom surface of nozzle and purge gas mount 108, and vacuum outlet port 156 is shown emerging from debris removal collar 112. Ring brush 148 has a perimeter 200, which need not be completely closed but is preferably substantially continuous, with points along perimeter 200 being located sufficiently far away from nozzle 110 to allow ejected particles to cool before making contact with ring brush 148. A small gap 206 in ring brush 148 provides to a gas conduit or hose 208 (FIGS. 1 and 3) access to purge gas inlet 130. Hose 206 and the bristles of ring brush 148 that contact the outer surface of hose 208 extending through gap 206 cooperate to provide a substantially closed barrier in that it prevents escape of surface debris 140 from internal volume 150. FIG. 2 also shows, included within laser cutting head 90, components of a vision alignment subsystem 210 to which are mounted several sets of numerous LEDs 215 (only eight of which shown for simplicity) used to illuminate the micromachining operation.

FIG. 3 is a replica of FIG. 1 but is annotated to indicate, using arrows, paths of cutting head gas flow, exhaust gas flow, and surface gas flow through various cavities within laser cutting head 90. A jet of cutting head inert gas 298 introduced into gas inlet 130 is confined within conically shaped gas pressure chamber 132, providing a substantially vertical downwardly directed cutting head gas flow 300 that issues from output nozzle 110. Cutting head gas flow 300 issuing from output nozzle 110 includes a portion of gas escaping into internal volume 150 and a portion of gas flowing through the kerf formed in target specimen 126 during micromachining. The portion of cutting head gas escaping into internal volume 150 is extracted through fluid passageway 158 and out of outlet port 156 by the remote vacuum pump, thus forming along target surface 124 a generally horizontal surface gas flow 305 that encounters in its path surface debris 140. Specifying the rate of surface gas flow 305 to be equal to or greater than the rate of cutting head gas flow 300 directs primarily toward vacuum outlet port 156 the path of ejected surface debris 140 confined within internal volume 150. A preferred rate of surface gas flow 305 is about 1.25 times the rate of cutting head gas flow 300 because it facilitates connection of hose 208 of workable diameter to purge gas inlet 130. When it reaches vacuum outlet port 156, surface gas flow 305 includes a mixture of inert cutting head gas and ambient air from the space within internal volume 150. In addition to confining ejected debris, ring brush 148 confines surface gas flow 305 and intensifies the action of negative pressure within internal volume 150, thereby increasing vacuum efficiency. Thus, encompassing internal volume 150 by ring brush 148 and extracting about 1.25 times the cutting head gas flow 300 enables automatic capture and disposal of the axial debris 138 and ejected surface debris 140 generated by the laser micromachining process.

It will be obvious to those having skill in the art that many changes may be made to the details of the above-described embodiments without departing from the underlying principles of the invention. The scope of the present invention should, therefore, be determined only by the following claims.

The invention claimed is:

1. In a method of capturing and removing debris generated by a laser micromachining system that includes a nozzle through which a laser beam propagates and a jet of cutting head gas flows at a cutting head gas flow rate along a common axis, respectively, to micromachine and thereby form a kerf in a specimen and to eject, through the kerf, debris generated by the micromachining of the specimen, the improvement comprising:

directing the laser beam for incidence on a target surface of the specimen to micromachine the specimen assisted by the flow of cutting head gas, the micromachining of the specimen ejecting from the kerf at high velocity surface debris of near molten temperature of the specimen in a direction along the target surface and ejecting axial debris in a direction transverse to the target surface;

providing a substantially closed barrier having a melting temperature and an effective center from which a perimeter distance defines in part a barrier internal volume, the barrier comprising a flexible fiber brush in the shape of a ring that includes first and second concentric ring members positioned, respectively, nearer to and farther from the common axis, the first ring member formed of temperature resistant bristle material and the second ring member formed of resilient, shape restorative bristle material;

positioning the barrier to encompass the common axis and thereby trap the ejected surface debris in the barrier internal volume;

setting the perimeter distance from the common axis to a value that allows the ejected surface debris to cool to a temperature below the melting temperature of the barrier before it traps the ejected surface debris; and introducing at a surface gas flow rate a surface gas flow directed to carry the ejected surface debris out of the barrier internal volume, the surface gas flow rate being greater than the cutting head gas flow rate to enable automatic capture and disposal of the surface debris produced by the laser micromachining of the specimen.

2. The method of claim 1, in which the barrier exhibits a flexibility property that leaves undamaged the target surface of the specimen when it makes contact with the barrier.

3. The method of claim 1, in which the ring brush is in the form of an annulus.

4. The method of claim 1, in which the jet of cutting head gas flows through a gas conduit for delivery to the nozzle, and in which the barrier includes a gap of sufficient size through which the gas conduit can pass.

5. The method of claim 1, in which the surface gas flow is delivered at vacuum pressure to the barrier internal volume.

6. The method of claim 1, in which the surface gas flow rate is equal to or greater than the cutting head gas flow rate.

7. The method of claim 1, in which the specimen includes metal and the laser beam incident on the target surface is of an infrared wavelength.

8. Apparatus for capturing and removing debris generated by laser micromachining of a specimen, comprising:

a laser cutting head including a nozzle through which a laser beam propagates and a jet of cutting head gas flows at a cutting head gas flow rate along a common axis;

a support for a specimen having a target surface, the support positioned so that the laser beam is incident on the target surface to micromachine the specimen and thereby eject molten debris from a kerf formed in the specimen, a surface debris portion of ejected molten debris flowing generally along the target surface;

a substantially closed barrier operatively connected to the laser cutting head and operatively contacting the target surface of the specimen when it is mounted on the support to form a barrier internal volume, the barrier positioned to encompass the common axis and thereby trap in the barrier internal volume the surface debris portion ejected during micromachining of the specimen, and the barrier comprising a flexible fiber brush in the shape of a ring that includes first and second concentric ring members positioned, respectively, nearer to and farther from the common axis, the first ring member formed of temperature resistant bristle material and the second ring member formed of resilient, shape restorative bristle material; and a vacuum outlet in fluid communication with the barrier internal volume to carry the ejected surface debris portion out of the barrier internal volume.

9. The apparatus of claim 8, in which the barrier exhibits a flexibility property that leaves undamaged the target surface of the specimen when it makes contact with the barrier.

10. The apparatus of claim 8, in which the ring brush is in the form of an annulus.

11. The apparatus of claim 8, in which the jet of cutting head gas flows through a gas conduit for delivery to the nozzle and in which the barrier includes a gap of sufficient size through which the gas conduit can pass.

12. The apparatus of claim 8, further comprising:
a debris removal collar forming a portion of the laser cutting head; and
a fluid passageway formed in the debris removal collar to provide the fluid communication of the vacuum outlet with the barrier internal volume.

13. The apparatus of claim 8, further comprising:
a debris removal collar forming a portion of the laser cutting head; and
a barrier mounting plate attached to the debris removal collar and providing for the barrier the operative connection to the laser cutting head.

14. The apparatus of claim 8, in which the specimen includes metal and the laser beam incident on the target surface is of an infrared wavelength.

\* \* \* \* \*